(12) United States Patent
Saito et al.

(10) Patent No.: US 6,415,071 B1
(45) Date of Patent: Jul. 2, 2002

(54) OPTICAL WAVELENGTH MULTIPLEXED TRANSMISSION MODULE, AND WAVELENGTH MULTIPLEXED TRANSMISSION SYSTEM USING THE SAME

(75) Inventors: Tsunetoshi Saito; Toshihiko Ota, both of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/543,589

(22) Filed: Apr. 5, 2000

(30) Foreign Application Priority Data

Apr. 5, 1999 (JP) .............................................. 11-97656

(51) Int. Cl.[7] ................................................. G02B 6/28
(52) U.S. Cl. ............................. 385/24; 385/37; 385/48
(58) Field of Search .............................. 385/24, 37, 48

(56) References Cited

U.S. PATENT DOCUMENTS 5,915,052 A * 6/1999 Ball ............................ 385/24

FOREIGN PATENT DOCUMENTS

JP          10-3012          1/1998  ............ G02B/6/12

* cited by examiner

*Primary Examiner*—Cassandra Spyrou
*Assistant Examiner*—Fayez Assaf
(74) *Attorney, Agent, or Firm*—Lacasse & Associates, LLC (57) ABSTRACT

The invention provides a small-sized optical wavelength multiplexed transmission module with suppressed noise, without increasing the size of the chip, wherein an optical filter (20) which interrupts light of a specified wavelength area other than the wavelength used for wavelength multiplexed transmissions is connected to an optical input waveguide side (11) of an arrayed waveguide type optical wavelength synthesizing and dividing device (10). Since the optical filter (20) can interrupt noise wavelength components, light passed through and divided by the arrayed waveguide optical wavelength synthesizing and dividing device (10) can become signal light of the use wavelength free from noise.

20 Claims, 9 Drawing Sheets

OPTICAL WAVELENGTH MULTIPLEXED TRANSMISSION MODULE, AND WAVELENGTH MULTIPLEXED TRANSMISSION SYSTEM USING THE SAME

FIELD OF THE INVENTION

The present invention relates to an optical wavelength multiplexed transmission module that is used for wavelength multiplexed optical transmissions, etc., and a wavelength multiplexed transmission system using the module.

BACKGROUND OF THE INVENTION

At present, practical use of optical waveguides (or PLC: Planar light wave circuit) having a plurality of optical waveguides disposed on a silicon or quartz ($SiO_2$), etc. substrate has prevailed in view of high bit rate integration and a decrease in production costs in the field of optical transmissions. As one of the optical waveguides, there is an optical waveguide element which divides one transmission light into a plurality, and optical splitters that split a light into 8 beams, 16 beams or 32 beams have been achieved.

Recently, as a method to remarkably increase a transmission capacity of optical transmissions, studies and research have been very active in optical wavelength multiplexed transmissions. Some of them have been practically applied.

Optical wavelength multiplexed transmission multiplexes and transmits a plurality of light having differing wavelengths. In such an optical wavelength multiplexed transmission system, a wavelength synthesizing and dividing module is indispensable, which can pick a plurality of transmitting light by wavelengths, or multiplex a plurality of light having differing wavelengths.

Figure 4:
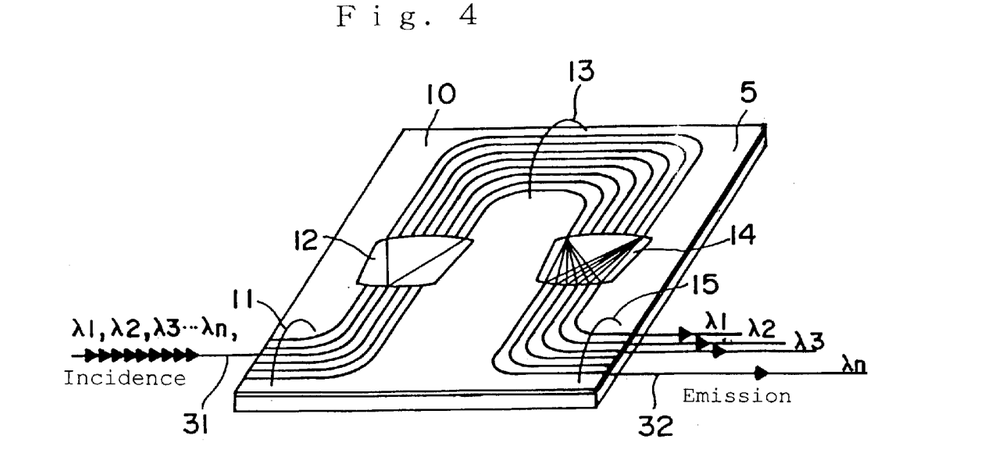
FIG. 4 is an explanatory view showing one example of an arrayed waveguide diffraction grating used in a wavelength multiplexed transmission system.

An arrayed waveguide diffraction grating (or AWG: Arrayed Waveguide Grading) as shown in FIG. 4 is available as one example of the wavelength synthesizing and dividing modules. The arrayed waveguide diffraction grating is such that a waveguide pattern is formed on a substrate as in an optical splitter.

In the waveguide pattern of the arrayed waveguide diffraction grating shown in FIG. 4, an incident side slab waveguide 12 acting as the first slab waveguide is connected to the emitting side of one or more incident waveguides formed in parallel on a substrate 5, and an arrayed waveguide 13 consisting of a plurality of waveguides formed in parallel is connected to the emitting side of the incident side slab waveguide. Also, an emitting side slab waveguide 14 acting as the second slab waveguide is connected to the emitting side of the arrayed waveguide 13, and a plurality of light emitting waveguides 15 formed in parallel are connected to and formed at the emitting side of the emitting side slab waveguide 14.

The arrayed waveguide 13 propagates light emitted from the incident side slab waveguide 12, and optical waveguides secured in parallel are formed with differing wavelengths. Waveguides adjacent to the arrayed waveguide portion are arrayed with a certain fixed optical circuit length ΔL.

Also, the incident waveguides 11 and emitting waveguides 15 are provided so as to correspond to the number of signal lights of differing wavelengths, which are divided by, for example, an arrayed waveguide diffraction grating 10.

A number (for example, 100) of arrayed waveguides 13 are provided. However, in FIG. 4, the number of the respective waveguides is reduced for the purpose of simplification of the drawing, and a few arrayed waveguides are illustrated. For example, a transmission side optical fiber 31 is connected to the incident waveguide 11 so that wavelength multiplexed light is introduced. Light introduced into the incident side slab waveguide 12 through the incident waveguide 11 is spread by its diffraction effect, and is made incident on a plurality of respective arrayed waveguides 13 to propagate in the respective waveguides 13.

Light propagated through the respective arrayed waveguides 13 reaches the emitting side slab waveguides 14 and is further condensed at and emitted from the emitting waveguides 15. Since, in the respective arrayed waveguides 13, the lengths are different by ΔL from each other in adjacent waveguides 13, shifts occur in individual light phase after light propagates through the respective arrayed waveguides 13, the wave plane of convergent light is inclined in accordance with the amount of shift, whereby the condensing position of light is determined by an angle of the inclination.

When light is made incident from the arrayed waveguides 13 on the emitting side slab waveguide 14, the relation indicated by the following expression (1) exists between an angle θ (diffraction angle) and the wavelength λ at which the light is condensed:

$$ns\ d\ \theta + nc\ \Delta L = m\lambda \qquad (1)$$

where ns is a refractive index of the slab waveguide 14, d is an interval between adjacent arrayed waveguides in the emitting side slab waveguide portion, nc is a refractive index of the arrayed waveguides, and m is a diffraction order. In the expression (1), for example, if the wavelength is assumed to be λ0 where λ=0 is assumed, $$\lambda 0 = nc\ \Delta L / m \qquad (2)$$

the above expression is established.

As has been made clear from the expressions (1) and (2) the positions where light of differing wavelengths are condensed at the emitting side of the emitting side slab waveguides 14 will become different from each other. By forming an emitting side waveguide 15 at the condensing position, lights of different wavelengths can be emitted from emitting side waveguides, whose wavelengths differs from each other, by wavelength.

Figure 5A:
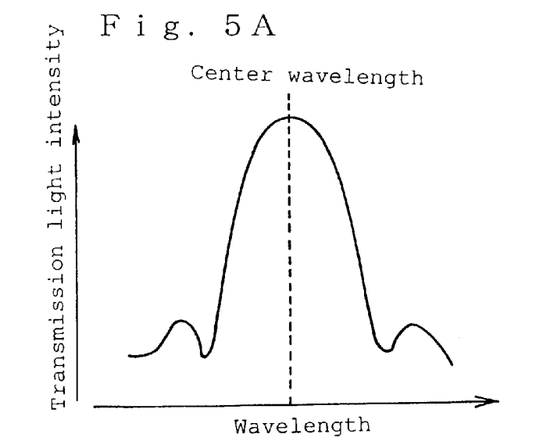
FIGS. 5A and 5B are explanatory views showing examples of light transmission characteristics of respective emitting waveguides of an arrayed waveguide diffraction grating used the wavelength multiplexed transmission system.

A transmission characteristic of the respective emitting side waveguides 15 is that they have certain transmission bandwidths centering around the respective wavelengths as shown in FIG. 5A. In FIG. 5A, the abscissa indicates a wavelength while the ordinate indicates a transmission characteristic of an optional port of an arrayed waveguide diffraction grating.

Figure 5B:
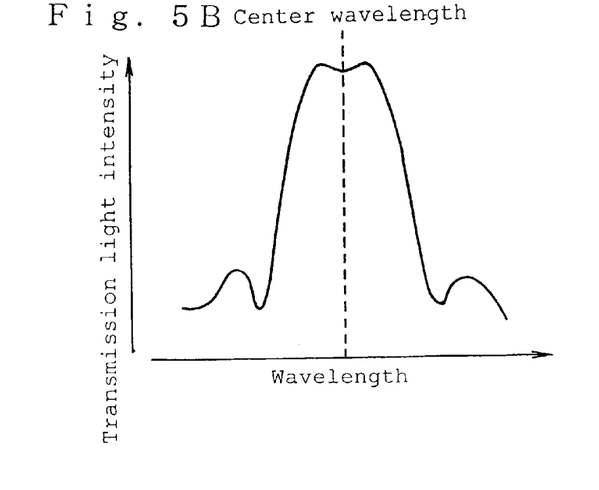

In FIG. 5A, although there is a spectrum that will become maximum at the center wavelength, the spectrum does not necessarily have only one maximum value, it may be of such a type which will have two maximum values as in FIG. 5B.

The wavelength (peak wavelength) showing a peak of the transmission characteristic having such a center wavelength is not one per port, and that can be established for the respective wavelengths with respect to differing positive integral values m of the expression (1).

A description is given of functions of the arrayed waveguide diffraction grating when it is used for optical transmissions. When wavelength multiplexed lights having wavelengths λ1, λ2, λ3 ... λn (n: an integral number) are inputted from a certain single incident waveguide 11, the lights are widened by the incident side slag waveguide 12, and reach the arrayed waveguide 13. Thereafter, the lights are condensed at differing positions by wavelengths via the emitting side slab waveguide 14 and are, respectively, emitted from differing emitting waveguides 15.

Subsequently, lights of the respective wavelengths can be picked up via optical fibers 32 for optical emission, which are connected to the emitting ends of the respective emitting waveguides 15. At this time, the wavelength characteristics of the transmission light intensity of the arrayed waveguide diffraction grating 10 shown in FIG. 4, respectively, become transmission spectra centering around the respective wavelengths ($\lambda 1, \lambda 2, \lambda 3 \ldots \lambda n$) as shown in FIG. 6.

Figure 6:
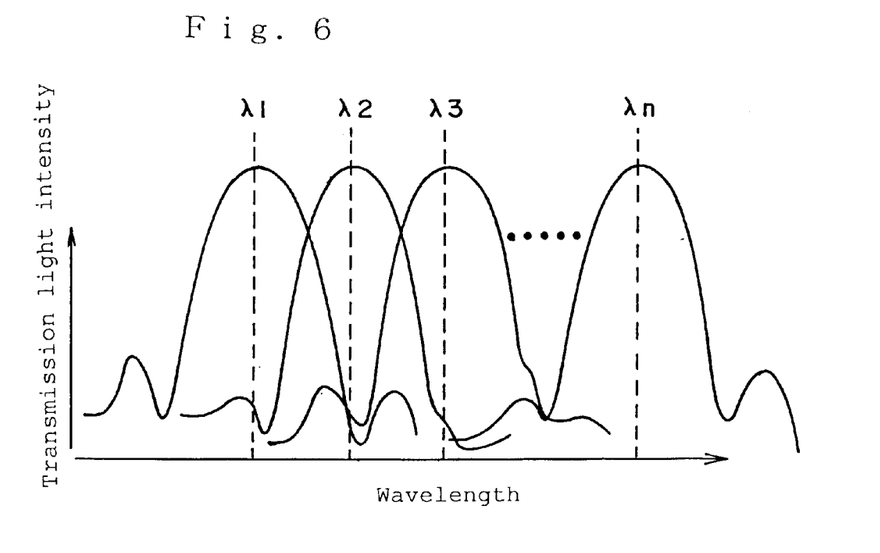
FIG. 6 is an explanatory view showing one example of light transmission characteristics of respective emitting waveguides an arrayed waveguide diffraction grating used the wavelength multiplexed transmission system.

Also, in FIG. 6, a pattern of wavelength characteristics of lights emitted from differing ports is caused to overlap as illustrated.

The example shown above shows actions of the arrayed waveguide diffraction grating 10 when dividing lights having multiplexed wavelengths.

Figure 7:
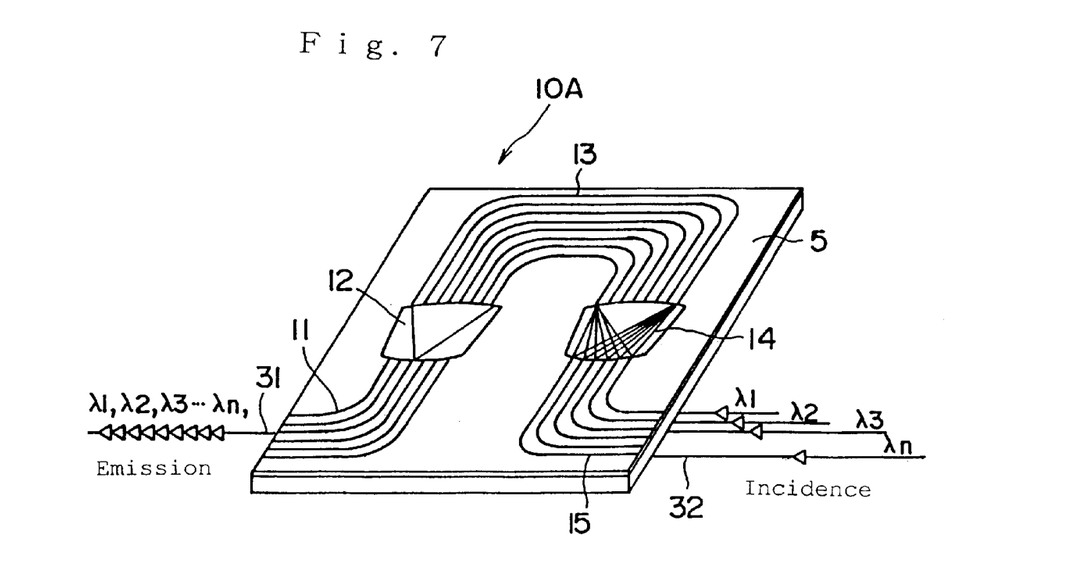
FIG. 7 is a view showing one example where the arrayed waveguide diffraction grating is used as a wavelength synthesizing and dividing device.

Also, as shown in FIG. 7, the same arrayed waveguide diffraction grating can function as a wavelength synthesizing element 10A by which light is emitted into the above incident waveguide 11 as wavelength-multiplexed light, where the above emitting waveguides 15 are made the incident waveguides corresponding to the lights of the respective wavelengths, and lights of the respective wavelengths are inputted into the above emitting waveguides 15, the lights pass through the second slab waveguide 14, arrayed waveguide 13, and first slab waveguide 12 in this order and are condensed.

Demand for an arrayed waveguide diffraction grating described above has rapidly increased as a wavelength synthesizer in wavelength multiplexed transmissions.

On the other hand, an optical fiber grating (FBG), in which intensive ultraviolet rays are irradiated to the core portion of the optical fiber and portions cyclically or roughly cyclically having differing refractive indexes are formed, has been known as a reflection type wavelength selection filter.

Since the optical fiber grating easily enables controlling of wavelengths, its demand has increased as an add/drop component by which an optional wavelength can be picked up and inserted in wavelength multiplexed transmissions.

Figure 8:
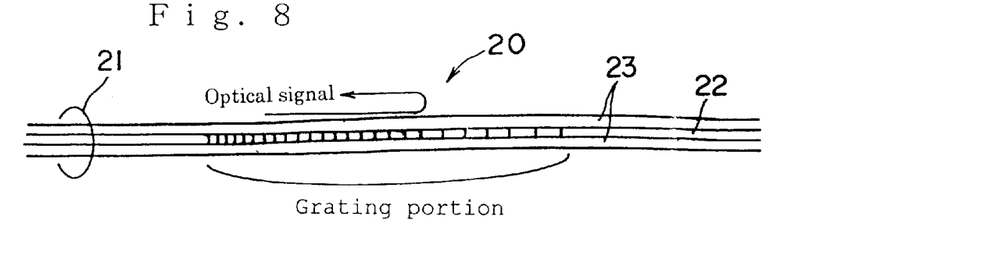
FIG. 8 is view showing one example of an optical fiber grating used in the wavelength multiplex transmission system.
Figure 9:
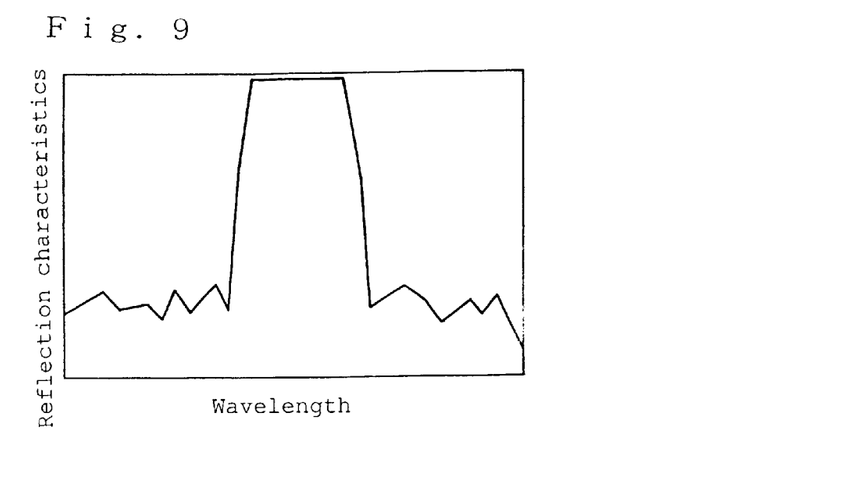
FIG. 9 is a view showing one example of reflection characteristics of an optical fiber grating used in the wavelength multiplexed transmission system.

FIG. 8 exemplarily illustrates the optical fiber grating 20, in which a portion having a high refractive index is roughly cyclically formed on the core 22 of the optical fiber 21 in the lengthwise direction of the optical fiber. 23 indicates cladding. In addition, FIG. 8 shows an example of chirped grating in which the cycle of the grating portion gradually changes. The reflection characteristics of the optical fiber grating 20 are illustrated as a graph in FIG. 9 where the abscissa indicates wavelength and the ordinate indicates reflection (logarithmic indication). FIG. 9 indicates a characteristic of reflecting light in a certain wavelength band. As a matter of course, the cycle of the grating may be constant.

It is possible to easily set the reflection wavelength and the wavelength range of reflection by controlling a cycle of the grating formed at the optical fiber 21 and the degree of fluctuation amount of the cycle.

Figure 10:
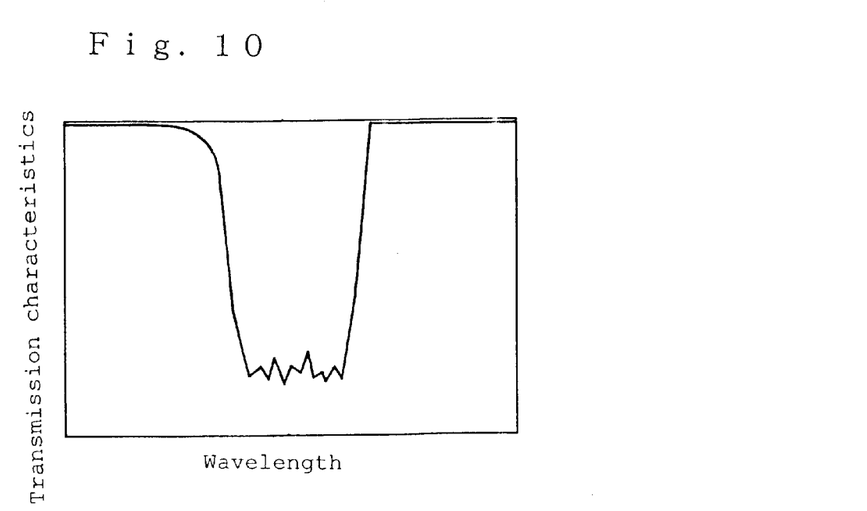
FIG. 10 is a view showing one example showing transmission characteristics of the optical fiber grating illustrated in FIG. 9.

FIG. 10 shows transmission characteristics of the optical fiber grating 20 having the reflection characteristics of FIG. 9. The transmission characteristics become equivalent to the effect by which light existing in the reflection wavelength range is interrupted and omitted.

As in general optical transmission systems, an optical amplifier is installed in a transmission channel to recover the light loss in the wavelength multiplexed transmission.

Figure 11:
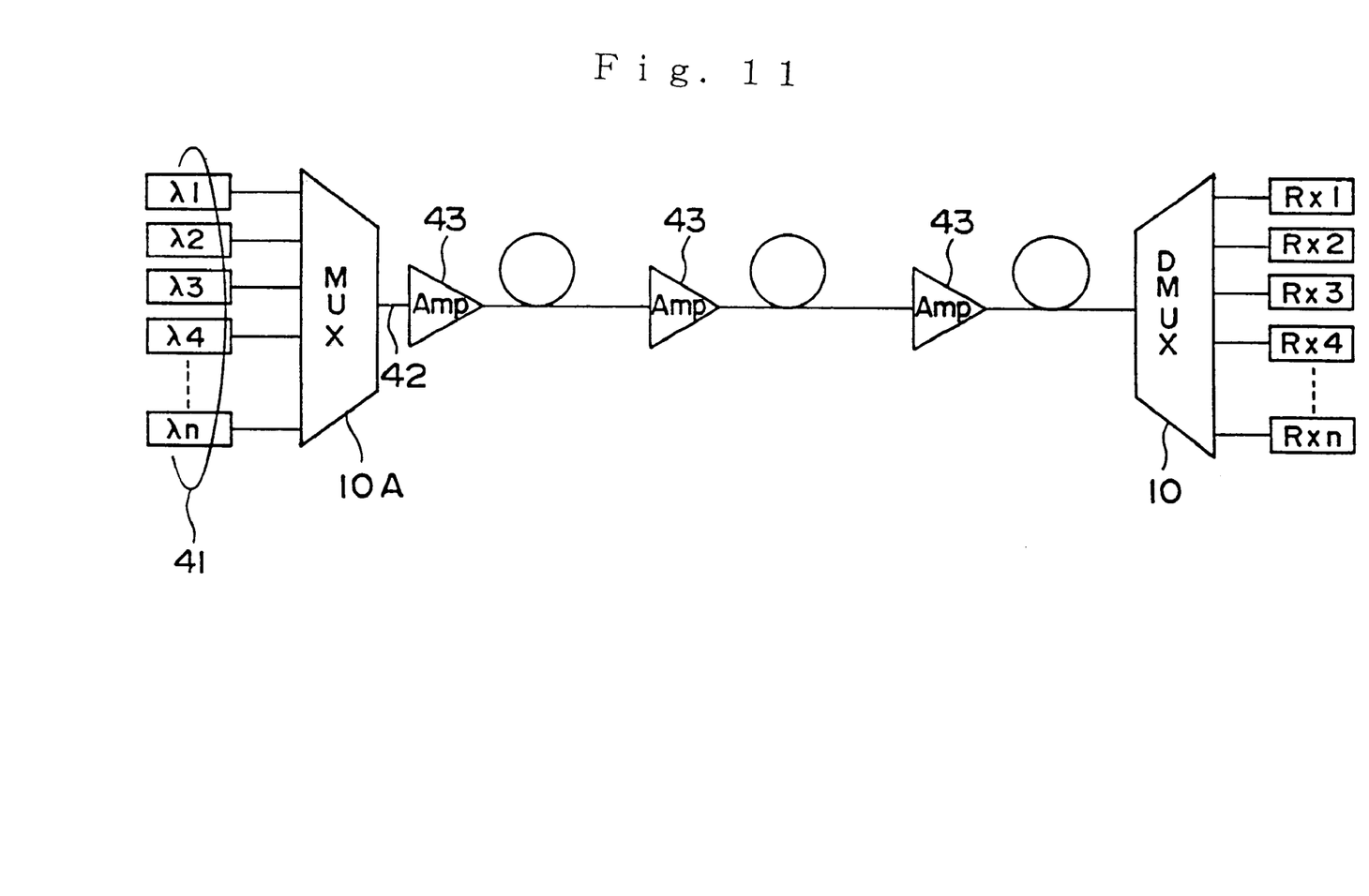
FIG. 11 is an exemplary view showing one example of the framework of a wavelength multiplexed transmission.

FIG. 11 exemplarily shows a framework of wavelength multiplexed transmission. Optical signals emitted from a plurality of light sources 41 having wavelengths from $\lambda 1$, through $\lambda n$ are condensed in a single optical fiber 42 synthesized by a wavelength synthesizer 10A, for example, an arrayed waveguide diffraction grating. Although the wavelength multiplexed optical signals are transmitted at a long haul, an optical amplifier 43 is provided in a transmission channel in order to compensate losses produced at the long haul. Three optical amplifiers 43 are provided in FIG. 11.

The optical amplifiers 43 have optical fibers to which generally erbium is doped, and a pumping laser to excite the erbium element. The range of wavelengths which can be amplified, generally, is 1530 nm through 1560 nm. Therefore, the wavelength used for a wavelength multiplexed transmission is limited to the range of wavelengths. A system which multiplexes optical signals of 8 through 32 wavelengths at a wavelength interval of 200 GHz interval (equivalent to approx. 1.6 nm) and 100 GHz interval (equivalent to approx. 0.8 nm) has been developed and made into use.

Further, recently, a grid wavelength has been publicly known by the recommendation of ITU-T, and the grid wavelength is defined to be 194.0 THz (1545.322 nm), 193.9 THz (1546.119 nm), 193.8 THz (1546.917 nm), or 193.7 THz (1547.715 nm) at the interval of 100 GHz (0.1 THz).

However, as described above, the peak spectrum of an arrayed waveguide diffraction grating does not necessarily exist by only one peak per emission port, and peak spectra exist with respect to different diffraction orders m of the expression (1).

That is, where it is assumed that the peak spectrum whose diffraction order is m is a peak spectrum having its center wavelength around 1550 nm, the peak wavelength whose diffraction order m is m+1 appears on a shorter wavelength side (for example 1525 nm) than 1550 nm, and the peak spectrum whose diffraction order m is m−1, the peak spectrum appears at a longer wavelength side (for example, 1575 nm) than 1550 nm.

The interval of the center wavelengths between the peak and the peak corresponding to the adjacent diffraction orders is called "FSR" (Free Spectral Range), and the interval depends on a difference ($\Delta L$) of the arrayed waveguide portion of the arrayed waveguide diffraction grating and length of the slab waveguides.

Figure 12:
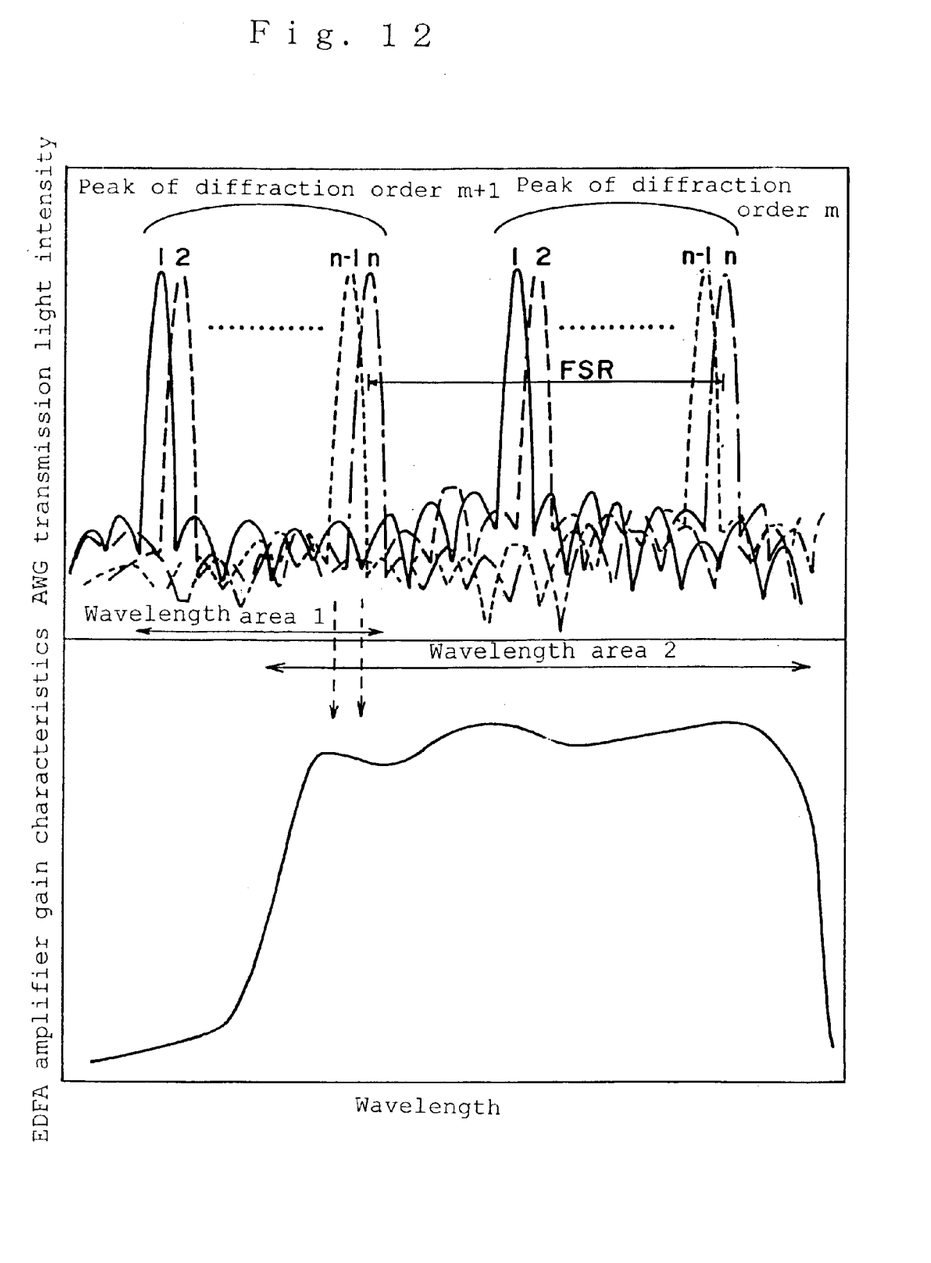
FIG. 12 is an exemplary view showing one example of the relationship between the light transmission characteristics of respective emitting waveguides corresponding to diffraction orders of an arrayed waveguide diffraction grating and the gain characteristics of an optical amplifier.

The upper side of FIG. 12 indicates a wavelength spectrum of the arrayed waveguide diffraction grating 10 in which the diffraction orders are adjacent to each other. The wavelength spectrum whose diffraction order is m is a wavelength spectrum in a wavelength multiplexed transmission, wherein the wavelength spectrum whose diffraction order m is larger by m+l than the above is a spectrum which become noise. In the same drawing, the wavelength spectrum whose diffraction order is m is shown as "wavelength 1" while a spectrum area 2 containing a part of a wavelength spectrum area whose diffraction order is m and a wavelength spectrum area whose diffraction order is m+1 expresses an amplification area of the optical amplifier. In addition, the underside of FIG. 12 exemplarily shows the gain characteristics (amplification ratio characteristic) of an optical fiber.

As shown in the upper side of FIG. 12, a peak whose order is m+1 exists at the short wavelength side of the peak, whose diffraction order is m, of the arrayed waveguide diffraction grating. Also, figures affixed to the upper part of the respective peaks indicate port numbers at the emitting side of an arrayed waveguide diffraction grating.

Herein, on the assumption of an optical transmission system of multiplexing 16 waves at an interval of 100 GHz using an arrayed waveguide diffraction grating in a wavelength range from 1530 nm through 1560 nm, the grid wavelength to be used is assumed to be 194.0 THz (1545.322 nm) through 192.5 THz (1557.363 nm).

At this time, the first through the sixteenth emitting ports of the arrayed waveguide diffraction grating will have such a peak spectrum where only light of the respective grid waveguides is permitted to pass therethrough, wherein the center wavelength of the first port is set at 194.0 THz (1545.322 nm) and that of the sixteenth port is set at 192.5 THz (1557.363 nm).

However, there exist peak wavelengths of different diffraction orders in some emitting ports. For example, in the sixteenth port at the emitting side, not only the peak spectrum of order m having the center wavelength of 192.5 THz (1557.363 nm) but also the peak wavelength around 1535 nm will exist as a peak wavelength having a diffraction order of m+1 if, for example, the FSR of the arrayed waveguide diffraction grating is 23 nm or so. That is, light of the peak wavelength existing in the vicinity of the 1535 nm will be emitted from the sixteenth port as well as light of 192.5 TH (1557.363 nm).

Light around 1535 nm becomes noise with respect to transmission light of 192.5 THz (1557.363 nm) in a wavelength multiplexed transmission and causes deterioration of optical transmission. At this time, for example, if the peak wavelength of the different diffraction order is apart from the band of the abovementioned optical amplifier 43, noise amplified by the optical amplifier 43 will not deteriorate the optical transmission without passing through the arrayed waveguide diffraction grating 10.

However, where a peak in wavelength having a different order, which passes through the arrayed waveguide diffraction grating 10 exists in the amplification band of the optical amplifier 43, noise amplified by the optical amplifier 43 passes through the arrayed waveguide diffraction grating 10 and will become noise with respect to transmission signals.

Figure 13A:
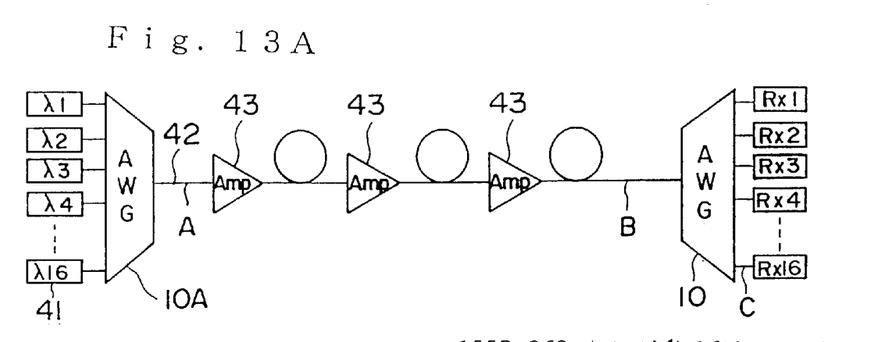
FIG. 13A through FIG. 13D are an exemplary view (FIG. 13A) where a prior art optical waveguide multiplexed transmission module is used in a wavelength multiplexed transmission system, and views (FIG. 13B through FIG. 13D) showing statuses of optical signals at respective points in a transmission channel.
Figure 13B:
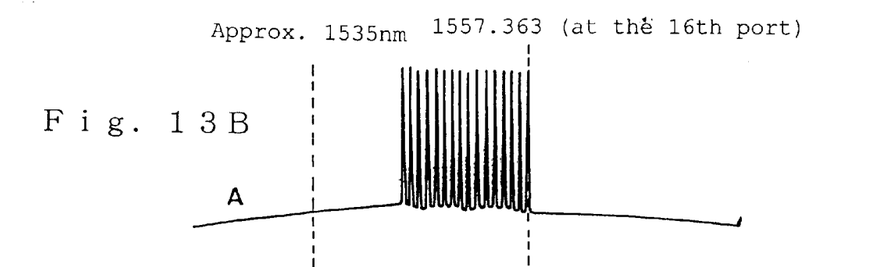
Figures 13C, 13D:
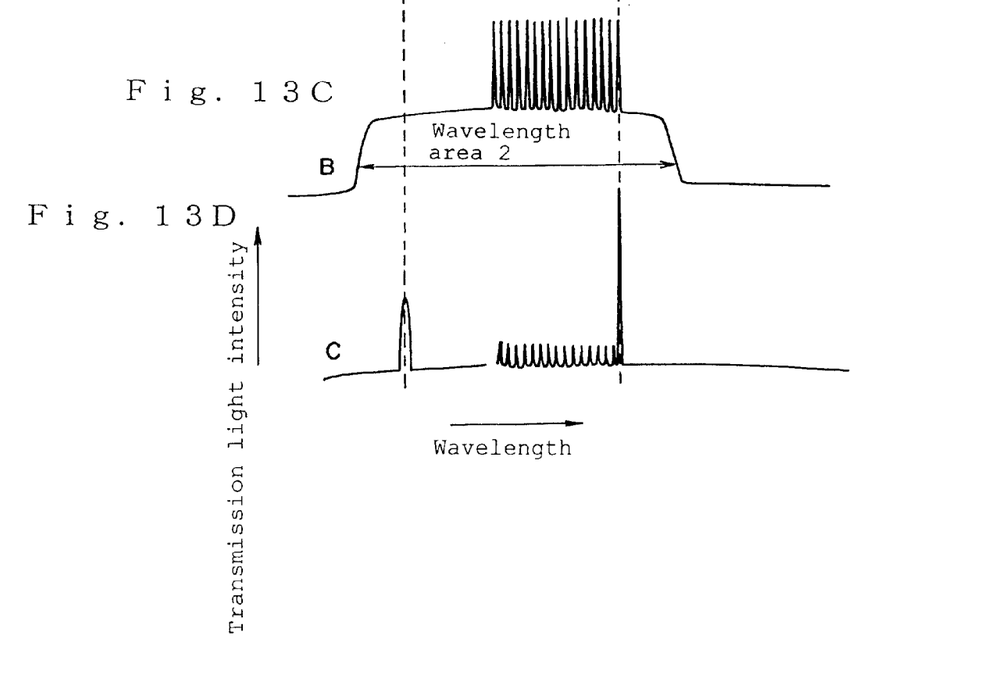

FIG. 13A through FIG. 13B show the above conditions, wherein FIG. 13A shows an exemplary of a waveguide multiplexed transmission system, and FIG. 13B through FIG. 13D show states of optical signals at respective points on the transmission channel of the system shown in FIG. 13A.

As shown in FIG. 13A, light emitted from a plurality of light sources 41 (λ1 through λ16) is multiplexed by the arrayed waveguide diffraction grating 10A in respect to wavelength, wherein, as shown in FIG. 13B, at point A, the light will have sixteen peaks. When the light transmits in a transmission channel, a plurality (three in FIG. 13A) of optical amplifiers 43 which amplify light are provided since the light intensity is weakened due to losses in the optical fibers 42. In connection with the light passed through the optical amplifiers 43, the background noise level is also amplified as shown in FIG. 13C all over the amplified band of the optical amplifier 43 at point B in FIG. 13A. The amplification waveband of the optical amplifiers 43 is indicated as a wavelength area 2.

As the light is divided by the arrayed waveguide diffraction grating 10, noise amplified around 1535 nm is transmitted at, for example, at the sixteenth port at point C in addition to the light of 1557.363 nm, which will become noise with respect to the signal light.

As one of the methods for avoiding the influence of noise, it may be set that a peak wavelength of the adjacent diffraction order does not enter the peak wavelength of diffraction order m. In other words, the peak wavelength of the adjacent diffraction order is not allowed to enter the amplification area of the optical amplifiers 43. However, it is necessary to further increase the FSR to do so.

This results in an increase in the size of an arrayed waveguide diffraction grating circuit. For example, in order to reduce the peak wavelength corresponding to the diffraction grating of m+1 to 1530 nm or less in, for example, the sixteenth port, it is necessary to make the FSR greater than 27 nm, whereby the arrayed waveguide diffraction grating will be made large-sized so that only one arrayed waveguide diffraction grating chip can be obtained from 4 inch sized wafer.

Therefore, an increase in scale of the FSR will adversely influence productivity of arrayed waveguide diffraction grating modules, and is not suitable for practical usage. The method can not be employed. Therefore, the peak wavelength corresponding to the diffraction order of m+1, which transmits through the sixteenth port of the arrayed waveguide diffraction grating will exist in the amplification band of optical amplifiers. The peak wavelength results in not only noise in transmission but also reduction of the amplification ratio (gain) of the peak wavelength.

Accordingly, in order to carry out a wavelength multiplexed transmission using the arrayed waveguide diffraction grating, it is necessary to make a structure in which a band pass filter allowing only a peak of diffraction order m to pass through is provided in ports through which peak wavelengths having other peak wavelengths (peak wavelengths amplified by amplifiers) than the diffraction order m can pass, and light other than the use wavelength does not ride on the transmission channel.

Figure 14:
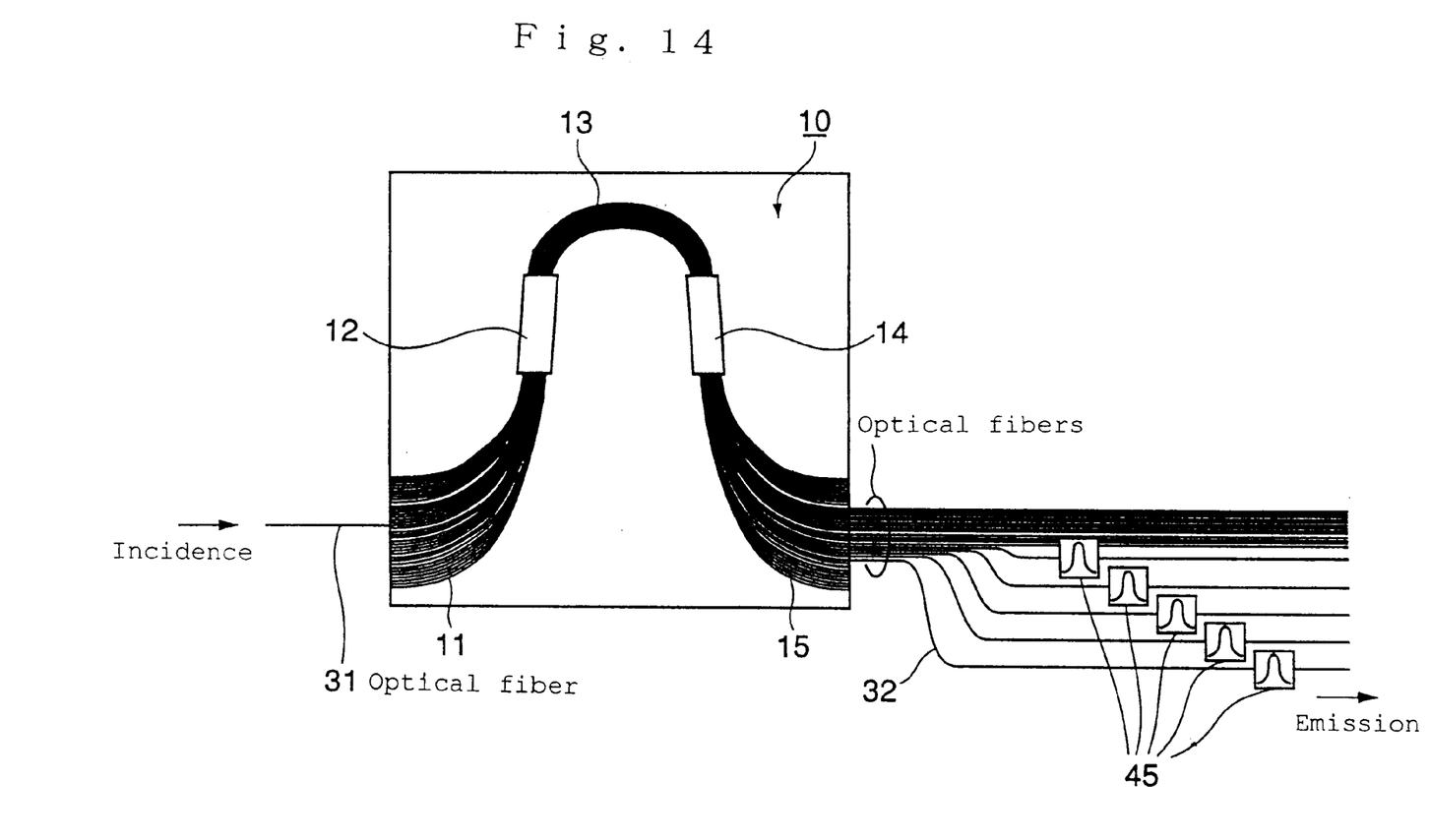
FIG. 14 is a view showing of an example in which a hand pass filter is incorporated in some of the emitting ports of an arrayed waveguide diffraction grating.

FIG. 14 shows the example, wherein a band pass filter 45 is provided in five ports of the emitting ports of the arrayed waveguide diffraction grating, and only light of a transmission wavelength is allowed to pass through, whereby light of different diffraction orders is interrupted.

OBJECTS AND SUMMARY OF THE INVENTION

In a wavelength multiplexed transmission using an arrayed waveguide diffraction grating as described above, since light wavelengths other than the transmission wavelength passes through the arrayed waveguide diffraction grating and is amplified by optical amplifiers, it was necessary to attach a filter to respective emitting ports of the arrayed waveguide diffraction grating and interrupt light other than the transmission wavelength.

Also, it is necessary to increase the FSR of the arrayed waveguide diffraction grating to eliminate t he necessity of attaching such an optical filter, wherein since the size of the arrayed waveguide diffraction grating chip is increased, the size of the arrayed waveguide diffraction grating module increases, and productivity of the arrayed waveguide diffraction grating also worsens, resulting in an increase in production cost thereof.

It is therefore an object of the invention to solve the abovementioned shortcomings and problems. In order to achieve the object, the present invention provides an optical wavelength multiplexed transmission module constructed as described below: That is, an optical wavelength multiplexed transmission module according to one aspect of the invention is featured in that a first slab waveguide is connected to the emitting side of one or more juxtaposed optical input waveguides, an arrayed waveguide consisting of a plurality of juxtaposed waveguides of differing wavelengths, which propagate light emitted from the corresponding first slab waveguide, is connected to the emitting side of the corresponding first slab waveguide, a second slab waveguide is connected to the emitting side of the corresponding arrayed waveguide, one or more juxtaposed optical output waveguides are connected to the emitting side of the corresponding second slab waveguide, a waveguide circuit of an arrayed waveguide optical wavelength synthesizing and dividing device is formed on a substrate, and an optical fiber having the function of interrupting light in a predetermined specified wavelength area is provided at the corresponding optical input waveguide side of the corresponding arrayed waveguide optical wavelength synthesizing and dividing device, whereby the corresponding optical waveguide multiplexed transmission module is provided with the function of preventing light in the corresponding specified wavelength area from passing through the corresponding arrayed waveguide optical wavelength synthesizing and dividing device.

An arrayed waveguide optical wavelength synthesizing and dividing device which constitutes the optical wavelength multiplexed transmission module of the invention is featured in that it is connected to an optical transmission line provided with an optical amplifier having a wavelength band including a use wavelength band of the wavelength multiplexed transmission as an amplification area and is used for optical multiplexed transmissions, wherein a specified wavelength area interrupted by the optical filter is a wavelength area excepting a use wavelength area of the wavelength multiplexed transmissions in a wavelength area in which the arrayed waveguide optical wavelength synthesizing and dividing device has wavelength synthesizing and dividing characteristics, and a wavelength area including a part of the amplification area of the corresponding optical amplifier.

Also, in another aspect, an arrayed waveguide optical wavelength synthesizing and dividing device which constitutes an optical wavelength multiplexed transmission module of the invention is featured in that it is connected to an optical transmission line provided with an optical amplifier having a wavelength band including a use wavelength band of the wavelength multiplexed transmission as an amplification area and is used for optical multiplexed transmissions, wherein a specified wavelength area interrupted by the optical filter is a wavelength area of a diffraction order differing from the diffraction order corresponding to a use wavelength area in wavelength multiplexed transmissions in the arrayed waveguide type optical wavelength synthesizing and dividing device, and is made a wavelength area including a part of the amplification of the corresponding optical amplifier.

Further, in still another aspect, an arrayed waveguide optical wavelength synthesizing and dividing device which constitutes an optical wavelength multiplexed transmission module of the invention is featured in that it is connected to an optical transmission line provided with an optical amplifier having a wavelength band including a use wavelength band of the wavelength multiplexed transmission as an amplification area and is used for optical multiplexed transmissions, wherein a specified wavelength area interrupted by the optical filter is a wavelength area of a diffraction order greater by only one order than the diffraction order corresponding to a use wavelength area in wavelength multiplexed transmissions in the arrayed waveguide type optical wavelength synthesizing and dividing device, and is made a wavelength area including a part of the amplification of the corresponding optical amplifier.

Preferably, the optical filter is directly formed in an optical input waveguide on a substrate having an arrayed waveguide optical wavelength synthesizing and dividing device formed thereon.

Further, preferably, an optical filter is an optical fiber grating that has a function of reflecting light existing in a predetermined specified wavelength area by cyclically forming a plurality of areas having differing refractive indexes in the core portion of the optical fiber.

Still preferably, an optical isolator to interrupt light reflected from the corresponding optical filter is connected to the preceding side of the optical filter.

Furthermore, the present invention provides an optical wavelength multiplexed transmission system in which the corresponding optical wavelength multiplexed transmission module is connected to an optical wavelength multiplexed transmission line equipped with an optical amplifier.

According to the invention, where an optical filter that has a function of interrupting light in a certain specified wavelength area other than the use wavelength area in optical wavelength multiplexed transmissions is connected to the incident waveguide side of an arrayed waveguide optical wavelength synthesizing and dividing device, for example, an arrayed waveguide diffraction grating, and light of diffraction orders differing from the use wavelength, which passes through the arrayed waveguide diffraction grating, is interrupted, it becomes possible to interrupt peaks having specified wavelength components, which become noise of differing diffraction orders, from light passing through the arrayed waveguide diffraction grating.

Also, according to the invention, where an optical filer, for example, a grating, is formed directly in the incident waveguide of the arrayed waveguide optical wavelength multiplexing and dividing device (for example, an arrayed waveguide diffraction grating), it becomes possible to easily make a small-sized optical wavelength multiplexed transmission module in which an arrayed waveguide diffraction grating and optical filter are integrated together.

In addition, by utilizing an optical fiber grating as the optical filter, an optical wavelength multiplexed transmission module according to the invention can be easily constructed.

Also, by incorporating an optical isolator in the preceding side of the optical filter (for example, an optical fiber grating), it is possible to prevent light reflected from the optical filter (optical fiber grating) from returning to the transmission lines, whereby optical signals can be stabilized.

According to an optical wavelength multiplexed transmission module of the invention, without attaching an optical filter to each of plural emitting ports of the arrayed waveguide diffraction grating with respect to an arrayed waveguide optical wavelength synthesizing and dividing device, for example, an arrayed waveguide diffraction grating, in which peaks of differing diffraction orders exist in the band of an optical isolator, and without increasing the size of the arrayed waveguide diffraction grating chip to widen the FSR, it becomes possible to interrupt noise of wavelengths corresponding to the peaks of differing diffraction orders in the arrayed waveguide diffraction grating, whereby a noise-suppressed module can be easily achieved at a low production cost.

Brief description of the Drawing

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENTS

Hereinafter, a detailed description is given of preferred embodiments of the invention with reference to the accompanying drawings. Also, in the description of the preferred embodiments, parts which are identical to those in the prior art are given the same reference numbers, and overlapping description thereof is omitted.

Figure 1:
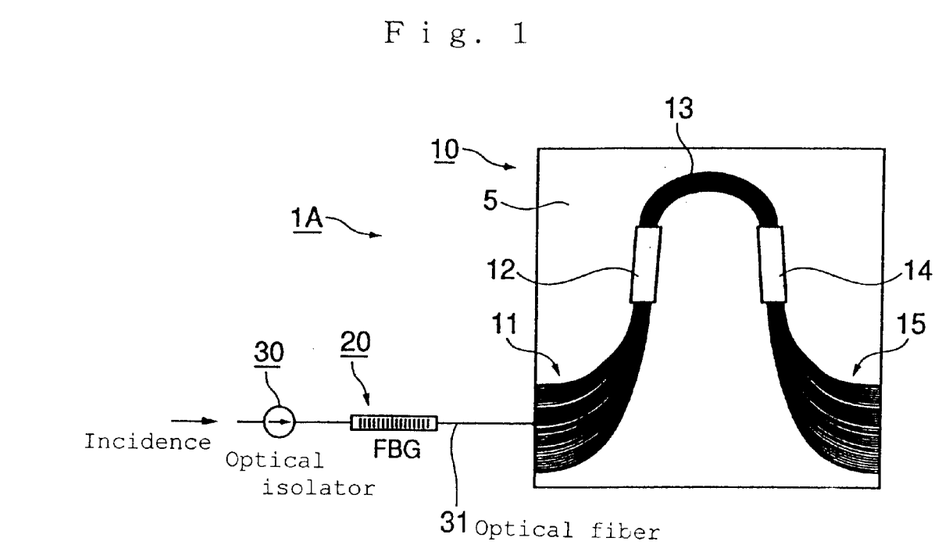
FIG. 1 is an explanatory view showing a first embodiment of an optical wavelength multiplexed transmission module according to the invention.

In FIG. 1, a construction of an embodiment of an optical wavelength multiplexed transmission module according to the invention is illustrated. In FIG. 1, 10 indicates an arrayed waveguide diffraction grating that functions as an arrayed waveguide optical wavelength synthesizing and dividing device, 20 indicates an optical fiber grating, and 30 indicates an optical isolator.

An optical fiber 31 is connected to the incident waveguide 11 of the arrayed waveguide diffraction grating 10 of the optical wavelength multiplexed transmission module, and an optical fiber grating is connected to the optical fiber 31. Also, the optical isolator 30 that interrupts light reflected from the optical fiber grating 20 is connected to the preceding side of the optical fiber grating 20.

Figure 2A:
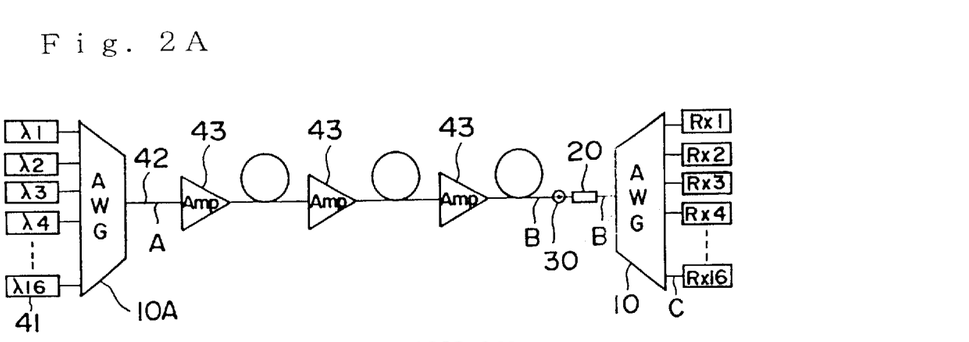
FIGS. 2A through 2F are an exemplary view (FIG. 2A) in the case where a optical wavelength multiplexed transmission module according to the invention is used in a wavelength multiplexed transmission system, and explanatory views (FIG. 2B through FIG. 2F) showing statuses of optical signals at respective points in a transmission channel.

FIG. 2A is an exemplary view where an optical wavelength multiplexed transmission module according to the invention is used in a wavelength multiplexed transmission system, and FIG. 2B through FIG. 2F illustrate the statuses of optical signals at respective points in a transmission channel.

The optical fiber grating of an optical wavelength multiplexed transmission module 1A according to the invention is designed so that it can reflect light having peaks of diffraction orders differing from the peaks corresponding to the transmission light of the arrayed waveguide diffraction grating 10 and in a range applied to a band of an optical amplifier 43. Resultantly, light of wavelengths corresponding to the reflected light can be interrupted. Such states are described with reference to FIG. 2A through FIG. 2F.

Figures 2B, 2C:
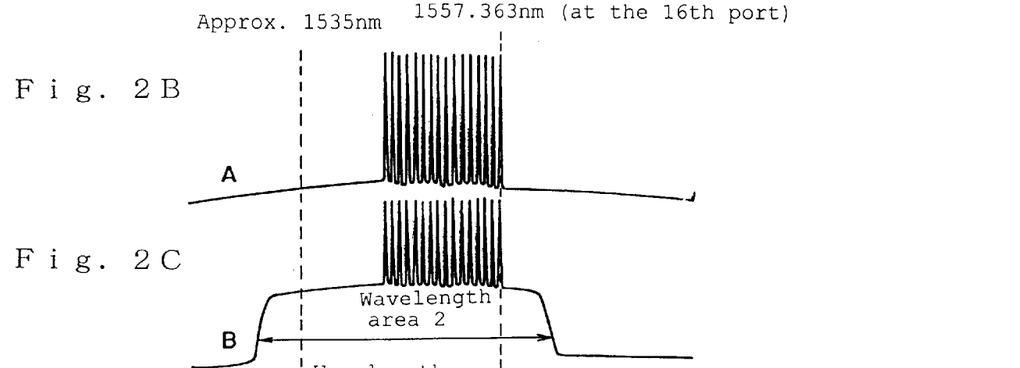

Light emitted from a plurality of light sources 41 (kl through λ16) is wavelength-multiplexed by a wavelength synthesizing element 10A consisting of an arrayed waveguide diffraction grating and becomes light having sixteen peaks as shown in FIG. 2B at point A in FIG. 2A. A plurality (in the preferred embodiment, three) of optical amplifiers 43 are provided, which amplify the light whose intensity is weakened due to losses of the optical fiber 42 when propagating through a transmission line. Thus, the optical signals thus weakened are amplified by the optical amplifiers 43. At this time, noise light other than the optical signals are also amplified, and in the light passed through the optical amplifiers 43, the background noise level is also amplified, as shown in FIG. 2C, all over the amplification band at point B in FIG. 2A, wherein the amplification area is indicated as wavelength area 2.

Conventionally, as the light is divided by the arrayed waveguide diffraction grating 10, light in a wavelength area (wavelength area 1) corresponding to a diffraction order (in the preferred embodiment, m+1) differing from the diffraction order m is allowed to pass through, along with the peak signal light having a diffraction order m, wherein light of the wavelength m+1 is left over in the transmission line as noise, which constitutes a problem.

Figures 2D, 2E:
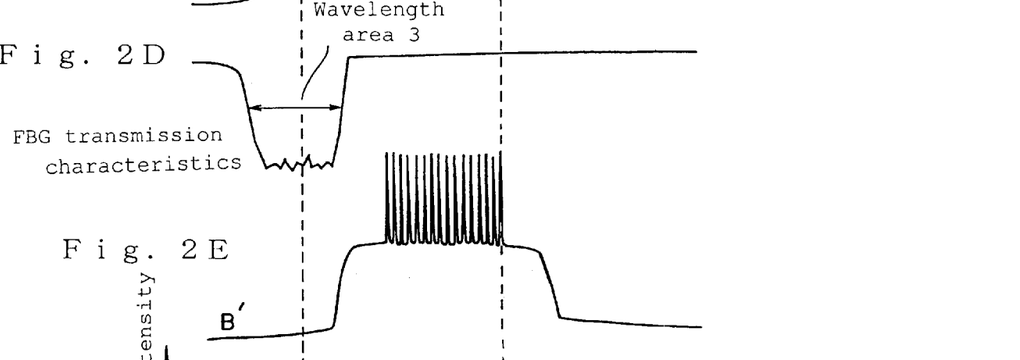

In the preferred embodiment, an optical fiber grating 20 that interrupts light in a wavelength area (wavelength area 3) shown in FIG. 2D, in which the wavelength area 1 and wavelength area 2, shown in FIG. 12, overlap each other, is incorporated in the preceding side of the arrayed waveguide diffraction grating 10. Therefore, noise in the wavelength area 3 being the interruption wavelength area of the optical fiber grating 20, which is included in the background noise amplified by the optical amplifiers 43, is cut off.

Figure 2F:
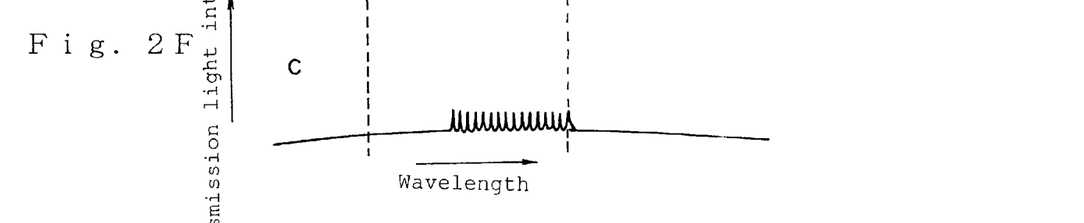

Light passed through the optical fiber grating 20 becomes as in FIG. 2E, at point B' in FIG. 2A. Where the light is divided by the arrayed wavelength diffraction grating 10, only the light of 1557.363 nm being signal light appears intensively at, for example, the sixteenth port at point C in FIG. 2A, as shown in FIG. 2F. Peak noise of light having conventionally appeared in the vicinity of wavelength 1535 nm having a diffraction order m+1, apart by FSR from the signal light peak, is extinguished, and does not appear any longer.

In the preferred embodiment, as in ports other than the sixteenth port, of the arrayed waveguide diffraction grating 10, the arrayed waveguide diffraction grating 10 has a characteristic by which light having a wavelength greater by one than the diffraction order apart by FSR from the peak wavelength of signal light is allowed to pass through. However, since noise amplified by the optical amplifiers 43 are cut off by the optical fiber grating incorporated in the preceding side of the arrayed waveguide diffraction grating 10, such noise does not reach the arrayed waveguide diffraction grating 10, whereby only the peaks of the signal light can be intensively emitted from the arrayed waveguide diffraction grating 10.

As a result, the noise amplified by the optical amplifiers 43 never worsens optical transmissions.

Furthermore, since noise is not amplified even though the light signals are further amplified, the amplification ratio of optical signals is not decreased.

Figure 3:
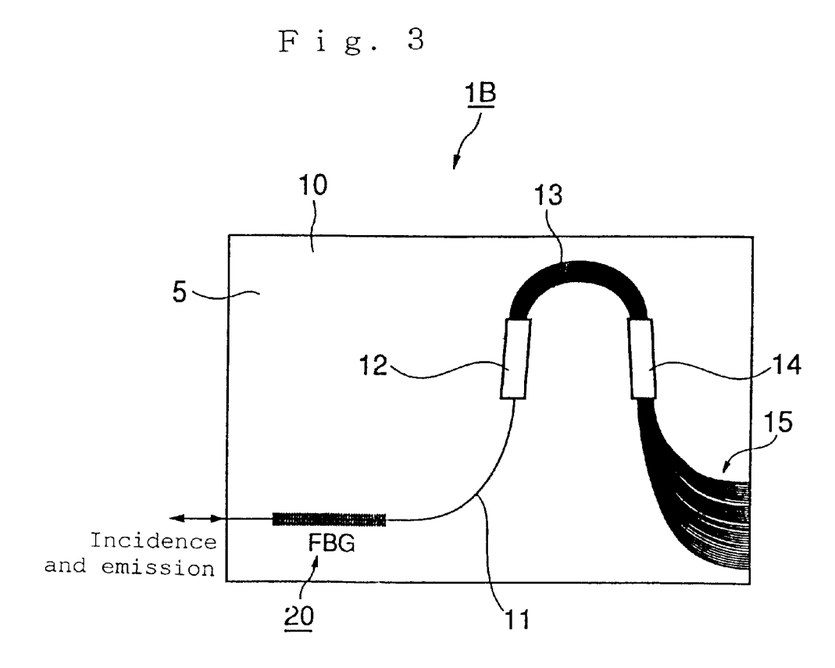
FIG. 3 is an explanatory view showing another embodiment of an optical waveguide multiplexed transmission module according to the invention.

FIG. 3 shows another preferred embodiment of the invention. An characteristic aspect of an optical wavelength multiplexed transmission module 1B according to the preferred embodiment is that a grating 20 which functions as a filter is formed directly in an incident waveguide 11 of a waveguide chip substrate 5 having an arrayed waveguide diffraction grating formed. Also, in the preferred embodiment, the roles brought about by the grating 20 are similar to those of the preferred embodiment illustrated in FIG. 1. However, by forming the grating 20 directly in an optical waveguide, the module size can be made small-sized, and the number of processes of producing the module is decreased, whereby it is possible to efficiently produce an optical wavelength multiplexed transmission module at low costs.

What is claimed is:

1. An optical wavelength multiplexed transmission module featured in that a first slab waveguide is connected to the emitting side of one or more juxtaposed optical input waveguides, an arrayed waveguide consisting of a plurality of juxtaposed waveguides of differing wavelengths, which propagate light emitted from said first slab waveguide, is connected to the emitting side of said first slab waveguide, a second slab waveguide is connected to the emitting side of said arrayed waveguide, one or more juxtaposed optical output waveguides are connected to the emitting side of said second slab waveguide, a waveguide circuit of an arrayed waveguide optical wavelength synthesizing and dividing device is formed on a substrate, and an optical filter having a function of transmitting an optical signal in the wavelength band of a predetermined diffraction order and interrupting light of the optical signal in the wavelength band of a diffraction order other than the predetermined diffraction order is arranged on said optical input waveguide side of said arrayed waveguide optical wavelength synthesizing and dividing device, wherein said optical waveguide multiplexed transmission module is provided with a function of preventing light in said specified wavelength area of the diffraction order other than thee predetermined diffraction order through said arrayed waveguide optical wavelength synthesizing and dividing device.

2. An optical wavelength multiplexed transmission module as set forth in claim 1, wherein the wavelength band of the predetermined diffraction order is set to a wavelength area having wavelength multiplexing-demultiplexing characteristics in the arrayed waveguide optical wavelength synthesizing and dividing device, and the wavelength area of the diffraction order other than the predetermined diffraction order for interrupting light by the optical filter is set to a wavelength area other than for a using wavelength area of the wavelength division multiplexing within the wavelength area having the wavelength multiplexing-demultiplexing characteristics in the arrayed waveguide optical wavelength synthesizing and dividing device.

3. An optical wavelength multiplexed transmission module as set forth in claim 2, wherein an optical filter is directly formed in an optical input waveguide on a substrate having an arrayed waveguide optical wavelength synthesizing and dividing device formed thereon.

4. An optical wavelength multiplexed transmission module as set forth in claim 2, wherein an optical filter is an optical fiber grating that has a function of reflecting light existing in a predetermined specified wavelength area by cyclically forming a plurality of areas having differing refractive indexes in the core portion of the optical fiber.

5. An optical wavelength multiplexed transmission module as set forth in claim 2, wherein an optical isolator to interrupt light reflected from said optical filter is connected to the preceding side of the optical filter.

6. An optical wavelength multiplexed transmission system, wherein said optical wavelength multiplexed transmission module described in claim 2 is connected to an optical wavelength multiplexed transmission line equipped with an optical amplifier.

7. An optical wavelength multiplexed transmission module as set forth in claim 1, wherein an optical filter is directly formed in an optical input waveguide on a substrate having an arrayed waveguide optical wavelength synthesizing and dividing device formed thereon.

8. An optical wavelength multiplexed transmission module as set forth in claim 1, wherein an optical filter is an optical fiber grating that has a function of reflecting light existing in a predetermined specified wavelength area by cyclically forming a plurality of areas having differing refractive indexes in the core portion of the optical fiber.

9. An optical wavelength multiplexed transmission module as set forth in claim 1, wherein an optical isolator to interrupt light reflected from said optical filter is connected to the preceding side of the optical filter.

10. An optical wavelength multiplexed transmission system, wherein said optical wavelength multiplexed transmission module described in claim 1 is connected to an optical wavelength multiplexed transmission line equipped with an optical amplifier.

11. An optical wavelength multiplexed transmission module characterized in that a first slab waveguide is connected to an emitting side of one or more juxtaposed optical input waveguides; an arrayed waveguide constructed by plural juxtaposed waveguides for propagating light transmitted from said first slab waveguide and having lengths different from each other is connected to an emitting side of said first slab waveguide; a second slab waveguide is connected to an emitting side of said arrayed waveguide; one or more juxtaposed light emitting waveguides are connected to an emitting side of said second slab waveguide; a waveguide circuit of an arrayed waveguide optical wavelength synthesizing and dividing device is formed on a substrate; an optical filter having a function of interrupting light in a predetermined specified wavelength area is arranged on said optical input waveguide side of the arrayed waveguide optical wavelength synthesizing and dividing device so that the optical wavelength division multiplexing module has a function of interrupting a passage of light in said specified wavelength area through said arrayed waveguide optical wavelength synthesizing and dividing device; the optical wavelength multiplexed transmission module is used in the wavelength division multiplexing by connecting the arrayed waveguide optical wavelength synthesizing and dividing device to an optical communication line having an optical amplifier in which a wavelength band including a using wavelength area of the wavelength division multiplexing is set to an amplifying area; and the specified wavelength area for interrupting light by the optical filter is set to a wavelength area which has a diffraction order differing from the diffraction order corresponding to the using wavelength area in the wavelength division multiplexing of the arrayed waveguide optical wavelength synthesizing and dividing device and includes one portion of the amplifying area of said optical amplifier.

12. An optical wavelength multiplexed transmission module as set forth in claim 11, wherein an optical filter is directly formed in an optical input waveguide on a substrate having an arrayed waveguide optical wavelength synthesizing and dividing device formed thereon.

13. An optical wavelength multiplexed transmission module as set forth in claim 11, wherein an optical filter is an optical fiber grating that has a function of reflecting light existing in a predetermined specified wavelength area by cyclically forming a plurality of areas having differing refractive indexes in the core portion of the optical fiber.

14. An optical wavelength multiplexed transmission module as set forth in claim 11, wherein an optical isolator to interrupt light reflected from said optical filter is connected to the preceding side of the optical filter.

15. An optical wavelength multiplexed transmission system, wherein said optical wavelength multiplexed transmission module described in claim 11 is connected to an optical wavelength multiplexed transmission line equipped with an optical amplifier.

16. An optical wavelength multiplexed transmission module characterized in that a first slab waveguide is connected to an emitting side of one or more juxtaposed optical input waveguides; an arrayed waveguide constructed by plural juxtaposed waveguides for propagating light transmitted from said first slab waveguide and having lengths different from each other is connected to an emitting side of said first slab waveguide; a second slab waveguide is connected to an emitting side of said arrayed waveguide; one or more juxtaposed light emitting waveguides are connected to an emitting side of said second slab waveguide; a waveguide circuit of an arrayed waveguide optical wavelength synthesizing and dividing device is formed on a substrate; an optical filter having a function of interrupting light in a predetermined specified wavelength area is arranged on said optical input waveguide side of the arrayed waveguide optical wavelength synthesizing and dividing device so that the optical wavelength division multiplexing module has a function of interrupting a passage of light in said specified wavelength area through said arrayed waveguide optical wavelength synthesizing and dividing device; the optical wavelength multiplexed transmission module is used in the wavelength division multiplexing by connecting the arrayed waveguide optical wavelength synthesizing and dividing device to an optical communication line having an optical amplifier in which a wavelength band including a using wavelength area of the wavelength division multiplexing is set to an amplifying area; and the specified wavelength area for interrupting light by the optical filter is set to a wavelength area which has a diffraction order greater by one order than the diffraction order corresponding to the using wavelength area in the wavelength division multiplexing of the arrayed waveguide optical wavelength synthesizing and dividing device, and includes one portion of the amplifying area of said optical amplifier.

17. An optical wavelength multiplexed transmission module as set forth in claim 16, wherein an optical filter is directly formed in an optical input waveguide on a substrate having an arrayed waveguide optical wavelength synthesizing and dividing device formed thereon.

18. An optical wavelength multiplexed transmission module as set forth in claim 16, wherein an optical filter is an optical fiber grating that has a function of reflecting light existing in a predetermined specified wavelength area by cyclically forming a plurality of areas having differing refractive indexes in the core portion of the optical fiber.

19. An optical wavelength multiplexed transmission module as set forth in claim 16, wherein an optical isolator to interrupt light reflected from said optical filter is connected to the preceding side of the optical filter.

20. An optical wavelength multiplexed transmission system, wherein said optical wavelength multiplexed transmission module described in claim 16 is connected to an optical wavelength multiplexed transmission line equipped with an optical amplifier.

* * * * *